US007380099B2

(12) United States Patent
Mathew et al.

(10) Patent No.: US 7,380,099 B2
(45) Date of Patent: May 27, 2008

(54) APPARATUS AND METHOD FOR AN ADDRESS GENERATION CIRCUIT

(75) Inventors: Sanu K. Mathew, Hillsboro, OR (US); Mark A. Anders, Hillsboro, OR (US); Sarvesh H. Kulkarni, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 10/956,164

(22) Filed: Sep. 30, 2004

(65) Prior Publication Data

US 2006/0069901 A1    Mar. 30, 2006

(51) Int. Cl.
*G06F 12/00*    (2006.01)
(52) U.S. Cl. .................... 711/220; 711/217; 708/490
(58) Field of Classification Search ................. 711/220
See application file for complete search history.

(56) References Cited

U.S. PATENT DOCUMENTS 5,508,952 A    4/1996  Kantabutra
5,860,154 A *  1/1999  Abramson et al. .......... 711/220
5,898,596 A    4/1999  Ruetz
6,807,616 B1 * 10/2004  McGrath et al. ............ 711/206
2002/0143841 A1* 10/2002  Farooqui et al. ............ 708/710
2003/0065700 A1*  4/2003  Mathew et al. ............. 708/714
2003/0145034 A1   7/2003  Tam
2003/0188125 A1  10/2003  Segelken et al.
2004/0078767 A1*  4/2004  Burks et al. .................... 716/8

* cited by examiner

*Primary Examiner*—Donald Sparks
*Assistant Examiner*—Hashem Farrokh
(74) *Attorney, Agent, or Firm*—Blakely, Sokoloff, Taylor & Zafman LLP (57) ABSTRACT

A method and apparatus for an address generation circuit. In one embodiment, the method includes computing a carry-in for at least one group of a predetermined number of bits of a propagate and a generate signal formed from a plurality of logical address components. Once the carry-in is computed, a plurality of conditional sums are generated for a logic 0 carry-in and a logic 1 carry-in. Subsequently, a sum is selected from the plurality of conditional sums to form a first portion of an effective address from the logical address components in a first stage and a second portion of the effective address in a second stage. In one embodiment, a fully dynamic high-performance sparse tree adder circuit that generates one in four carries, is used to form an address generation circuit, in accordance with one embodiment. Other embodiments are described and claimed.

30 Claims, 8 Drawing Sheets

APPARATUS AND METHOD FOR AN ADDRESS GENERATION CIRCUIT

FIELD OF THE INVENTION

One or more embodiments relate generally to the field of integrated circuit and computer system design. More particularly, one embodiment relates to a method and apparatus for an address generation circuit.

BACKGROUND OF THE INVENTION

High performance microprocessors use a variety of memory management techniques to map a logical address to a physical address space. These techniques includes features, such as segmentation and paging, which allow memory to be managed efficiently and reliably. The address generation unit (AGU) is a key component of the memory management block of high performance microprocessors.

AGUs within high performance microprocessors are used to compute the effective address of the locations being addressed in memory. This operation is defined as:

$$\text{Effective Address} = (\text{segment} + \text{displacement}) + \text{base} + (\text{index} * \text{scale}) \quad (1)$$

A variety of addressing modes can be implemented by choosing appropriate values for each of the five address components provided in Equation (1). Regardless of the selection of values for the various components of the effective address, an AGU requires, for example, 32-bit and 64-bit addition to compute the effective address. Accordingly, effective address computation is a performance critical, single cycle operation that requires a high performance AGU.

Hence, AGUs in microprocessors require a high performance adder core to compute the effective addresses of memory locations being accessed. Unfortunately, best known methods for implementing adder cores use non-optimal fan outs and an expensive carry-merge tree structure, resulting in high wiring complexity and thus increased area and power. As a result, the activity of the AGU can create thermal hotspots and sharp temperature gradients in the execution core of high performance microprocessors that may considerably affect circuit reliability and increase cooling costs. The presence of multiple execution engines in current processors, such as chip multiprocessors (CMP) further aggravates the problem.

BRIEF DESCRIPTION OF THE DRAWINGS

Various embodiments of the present invention are illustrated by way of example, and not by way of limitation, in the figures of the accompanying drawings and in which.

DETAILED DESCRIPTION

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the embodiments described herein may be practiced without such specific details. In other instances, control structures and gate level circuits have not been shown in detail to avoid obscuring the embodiments described herein. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

Figure 1:
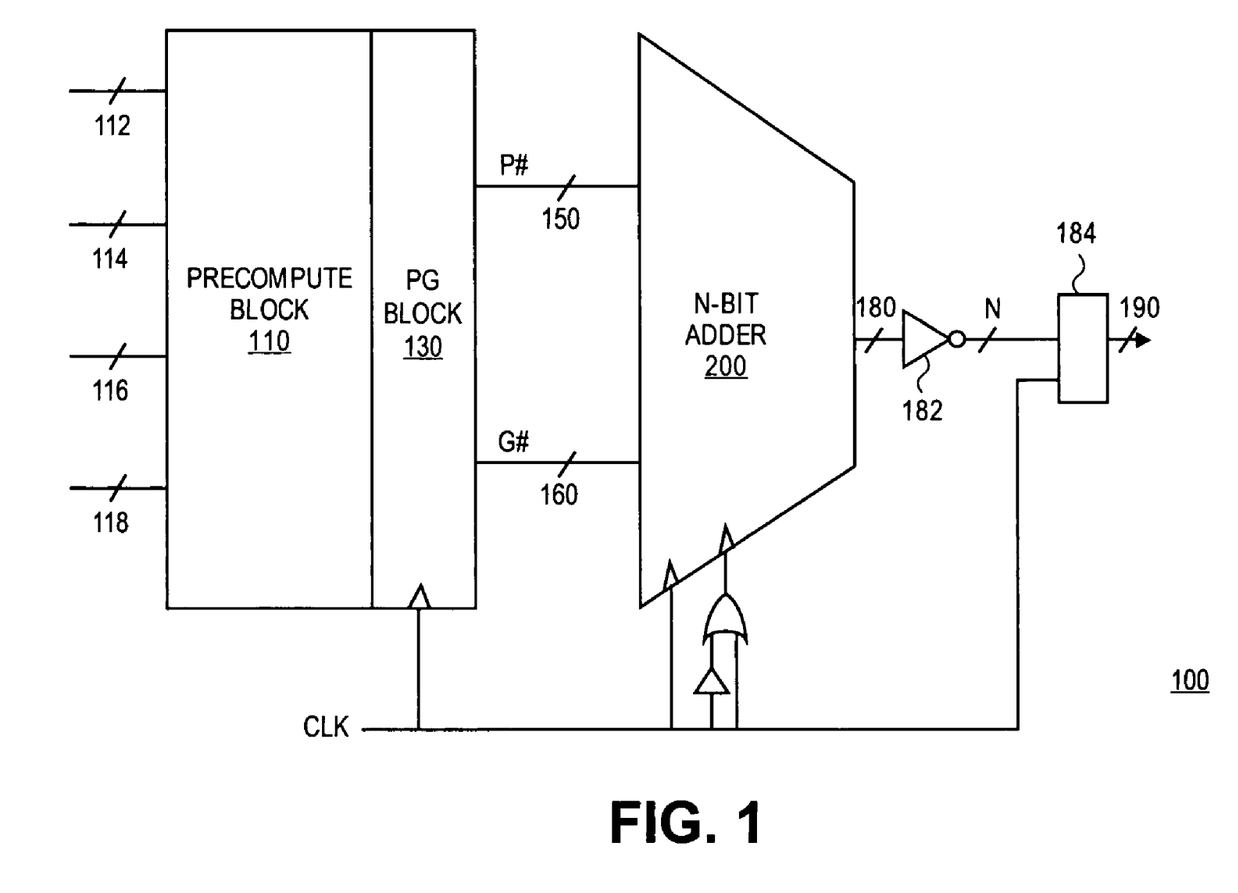
FIG. 1 is a block diagram illustrating an address generation circuit, in accordance with one embodiment.

FIG. 1 is a block diagram illustrating an address generation circuit/unit (AGU) 100 to compute an effective address from a plurality of logical address components, in accordance with one embodiment. As described above, effective address computation is a performance critical, single cycle operation that requires a high performance AGU. In one embodiment, AGU 100 includes adder 200 to enable the computation of an effective address from one or more logical address components to reduce thermal hot spots and sharp temperature gradients in the execution core generally caused by the high activity of conventional AGUs.

Representatively, static block 110 of AGU receives input signals 112, 114, 116 and 118. In one embodiment, the input signals represent logical address components for computation of an effective address. As described above, high-performance microprocessors use a variety of memory management techniques, such as virtual memory, to map a logical address to a physical address within memory. As described herein, "virtual memory" refers to a memory management technique where a large linear address space is simulated with a small amount of volatile physical memory and some disk storage. As further described above, an effective address may be formed from logical address components, such as a segment, a displacement, a base, an index and a scale, according to Equation 1.

Figure 2:
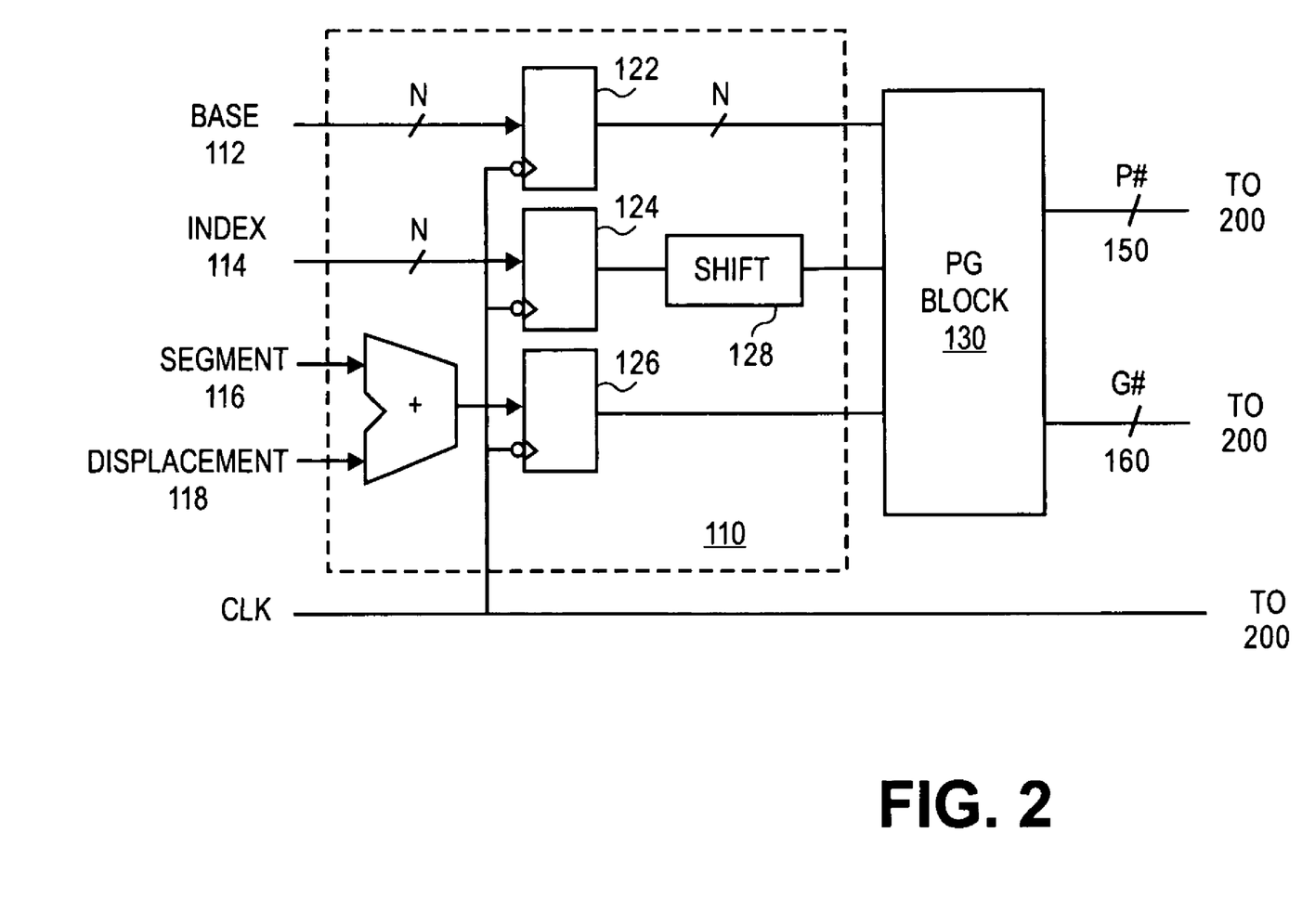
FIG. 2 is a block diagram illustrating pre-computation logic of the address generation unit of FIG. 1 to process logical address components, in accordance with one embodiment.

FIG. 2 further illustrates pre-compute block 110 and propagate generate (PG) block 130 of FIG. 1. Representatively, pre-compute block 110 receives base 112, index 114, segment 116 and displacement 118 and a scale value, which is loaded within shift register 128. Of the five operands involved in the effective address computation, two operands, segment 116 and displacement 118 are available ahead of time. Therefore, their sum may be pre-computed in a previous cycle using adder 120, thereby reducing the AGU operation to a three operand N-bit addition. Base 112 and index 114 are register operands that are available at the start of the cycle and scale is a value of 1, 2, 4 or 8 that is multiplied to the index address according to Equation 1 to provide a scaled-index. A variety of addressing modes can be implemented by using appropriate values for each of the five address components.

As illustrated in FIG. 2, effective address computation occurs in two phases with latches 122, 124 and 126 representing a first cycle boundary. In a first phase, input latches 122, 124 and 126 are transparent. Subsequently, base 112 and scaled-index 114, as well as the pre-computed segment and displacement addresses propagate through input latches 122, 124 and 126 and are added using PG block 130. In one embodiment, PG block 130 comprises a static transmission gate XOR based full adder circuit that adds three input bits generating propagate signal (P#) 150 and generate signal (G#) 160. Propagate signal 150 and generate signal 160 are subsequently provided to adder 200 to compute a sum from the propagate and generate signals to provide effective address 190 from the logical address components.

Figure 3:
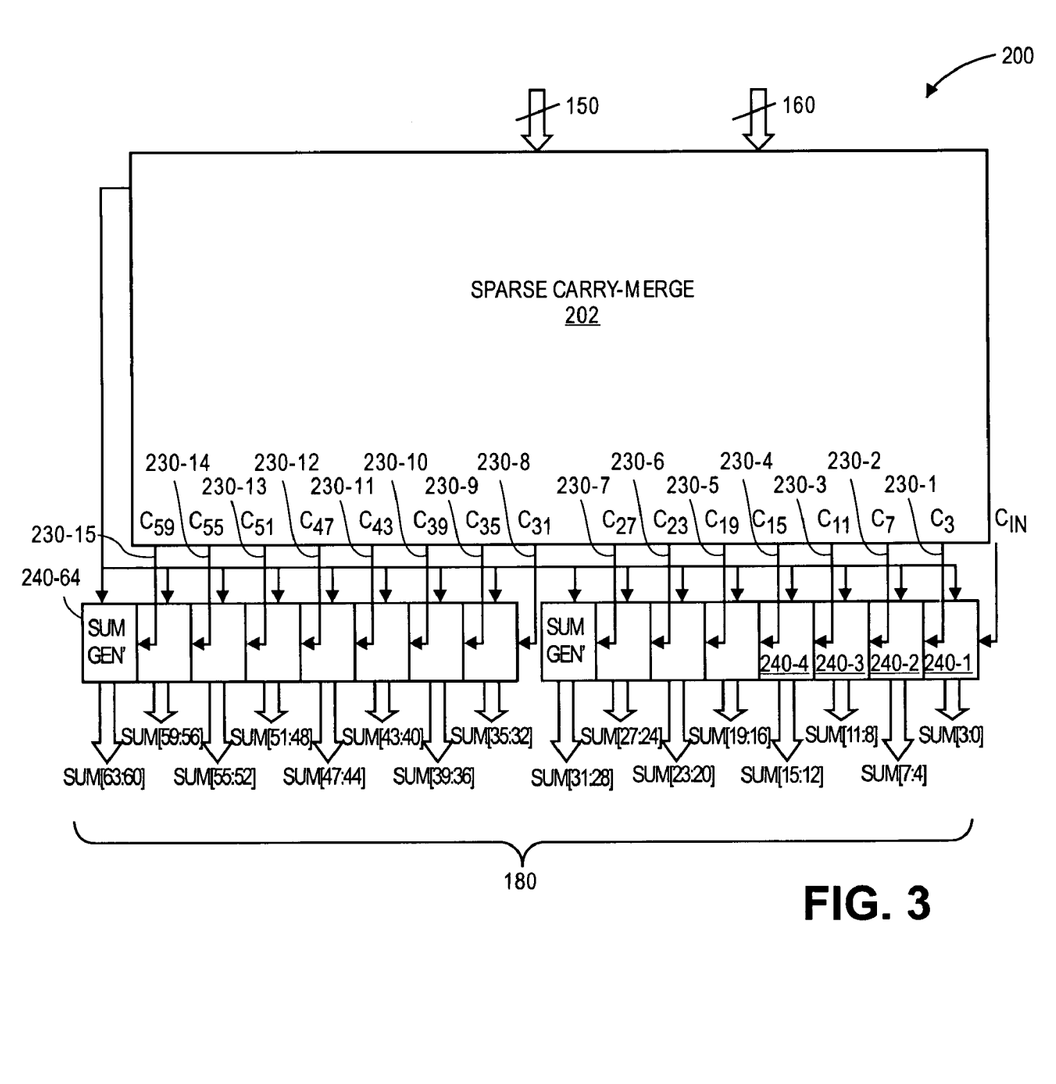
FIG. 3 is a block diagram further illustrating an adder of the address generation circuit of FIG. 1, in accordance with one embodiment.

FIG. 3 is a block diagram illustrating adder 200, in accordance with one embodiment. Representatively, adder 200 includes sparse carry-merge circuit 202 to generate a plurality of group carries 230 (230-1, ..., 230-15), which are provided to sum generators 240 (240-1, ..., 240-64). As described in further detail below, sum generations 240 each selects between a pair of results according to a respective group carry 230 from sparse carry-merge circuit 202 to provide N-bit output 180. Accordingly, although illustrated to generate a 64-bit sum, it should be recognized that sparse carry-merge circuit 202 and sum generators 240 may be configured to provide a 16-bit, 32-bit, 64-bit, 128-bit and the like output based on a desired implementation.

Representatively, sparse carry-merge circuit 210 is illustrated as generating group of carries 230 or carry signals (C3, C7, C11, C15, C19, C23, C27, C31, C35, C39, C43, C47, C51, C55 and C59). Representatively, sparse carry merge-circuit 202 is illustrated as generated one carry for each group of 4-bits of 64-bit propagate and generate signals. However, in alternative embodiments, sparse carry-merge circuit 202 may be configured to generate one carry for each group of 16-bits, one carry for each group of 8-bits or one carry for each group of 4-bits, as illustrated, to provide a quaternary tree adder. Accordingly, in contrast to conventional high-performance adders, instead of generating one carry for each bit (C0, C1, ..., C62, C63), sparse carry-merge circuit 202 generates a group carry 230 according to a desired configuration.

Representatively, adder 200 includes a plurality of sum generators 240 coupled to the sparse carry-merge circuit 202 to provide a final sum 180 from the propagate and generate signals. As described in detail below, each sum generator 240 computes a sum for a group of a predetermined number of bits, such as 4-bits of propagate signal 150 and generate signal 160, grouped from a least significant bit (LSB). In one embodiment, a final sum is selected according to a respective one of the one-in-four carries or group carries 230 received from sparse carry-merge circuit 202. In one embodiment, the conditional sum generator 240-1 will compute a sum (3:0) generated from bits 0-3 of the propagate and generate signals using carry-in (Cin). Similarly, second conditional sum generator 240-2 computes a sum (7:4) generated from bits 4-7 of propagate signal 150 and generate signal 160 using carry C3 as the carry-in and so forth for other conditional sum generators 240 shown in FIG. 3.

Figure 4:
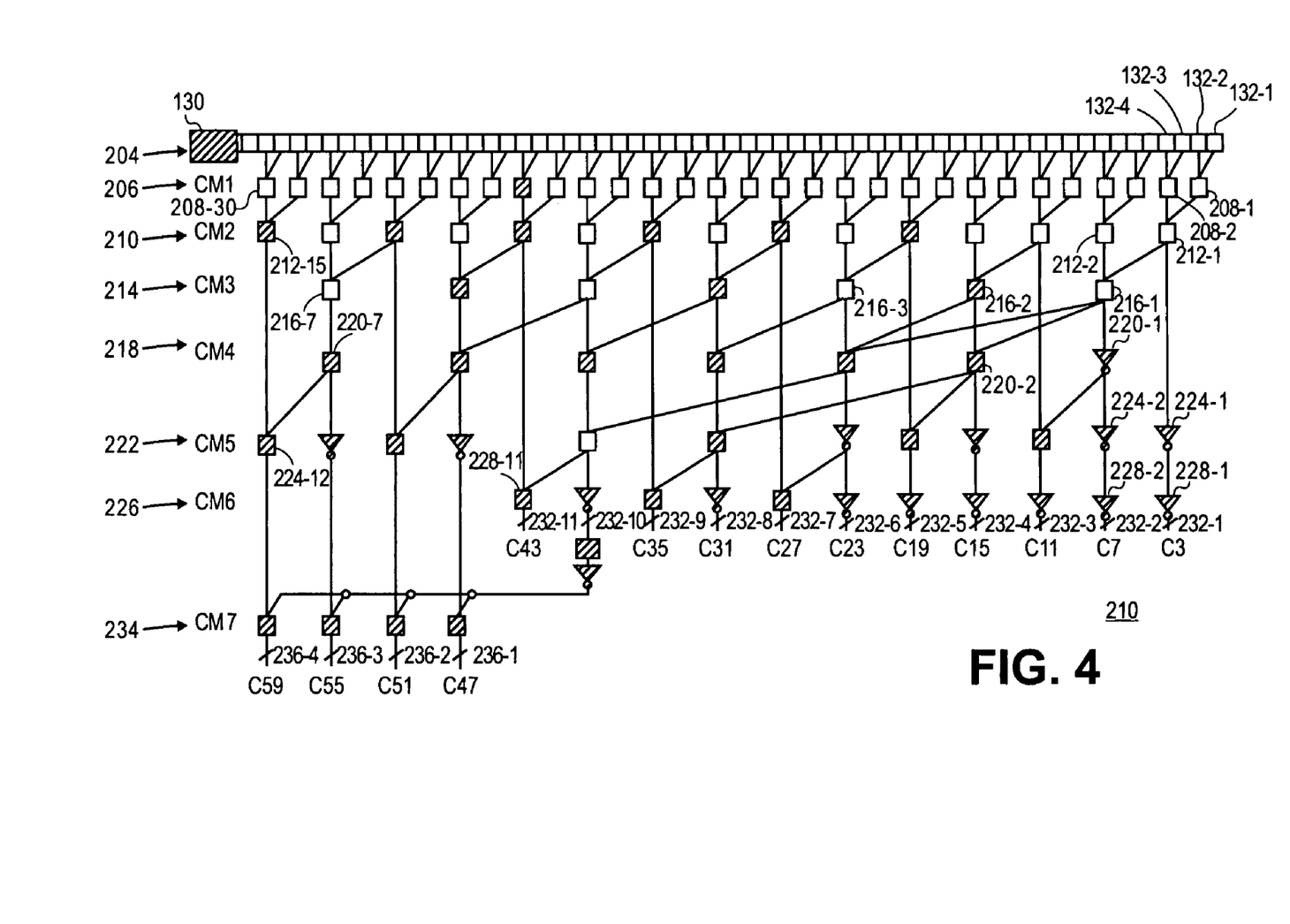
FIG. 4 is a block diagram further illustrating a sparse carry-merge circuit of FIG. 3, in accordance with one embodiment.

FIG. 4 is a block diagram further illustrating carry-merge circuit 202 of FIG. 3, in accordance with one embodiment. Representatively, sparse carry-merge circuit includes six carry-merge (CM) stages (CM1, CM2, CM3, CM4, CM5 and CM6). As is described below, processing via CM stages CM1 206-CM6 226 produces a plurality of group carry signals 230. In one embodiment, group carry signals 232 (232-1, ..., 232-11) are generated in a prior stage to generation of group carry signals 236 (236-1, 236-2, 236-3, 236-4).

Representatively, first group carry signals 232 are provided in a CM6 stage 226 and second group carry signals 236 are provided in a subsequent CM7 stage 234. In one embodiment, providing first group carry signals in a CM6 stage 226, enables generation of a 48-least significant bits of an effective address from the logical address components. However, in an alternative embodiment, for example, as illustrated with reference to FIG. 2, first group carry signals 232 and second group carry signals 236 are provided concurrently to enable N-bit output 180.

As illustrated with reference to FIG. 2, in one embodiment, PG block 130 may be incorporated within adder 200. However, it should be recognized that illustration of PG block 130 integrated within adder 200 is shown to provide a detailed explanation of one embodiment. Accordingly, PG block 130 may be integrated within adder 200 or provided as a separate block of AGU 100, while remaining within the scope of the described embodiments.

Representatively, PG block 130 of FIGS. 1 and 2 is also shown as first stage 204. In one embodiment, PG block 130 merges each of the 0-63 bits of the binary numbers received from pre-compute logic 110 to generate a plurality of propagate signals $P_i$ (where i=0, 63) and a plurality of generate signals $G_i$ (where i=0, 63). Logic gates 132 each perform an "exclusive OR" logic operation on each pair of the bits 0-63 to generate the plurality of propagate signals $$(P_i = A_i \oplus B_i) \quad (2)$$

and the logic gates 132 also each perform an "AND" logic operation on each pair of received bits to generate the plurality of generate signals:

$$(G_i = A_i \cdot B_i) \quad (3)$$

In one embodiment, sparse carry-merge circuit 202 includes a plurality of first carry-merge (CM) logic gates 208 (208-1, ..., 208-30) (represented by each of the blocks in second stage 206). Each CM logic gate 208 is coupled to two adjacent logic gates 132 of first stage 204 and will merge the two propagate signals ($P_i$ and $P_{i-1}$) and the two generate signals ($G_i$ and $G_{i-1}$) from the two adjacent logic gates 132 of first stage 204. The logic equation of the CM logic gate 208-1 for an output propagate signal is:

$$\text{Pout} = P_i \cdot P_{i-1} \quad (4)$$

The logic equation of CM logic gate 208-2 for an output generate signal is:

$$\text{Gout} = G_i + P_i \cdot G_{i-1} \quad (5)$$

Accordingly, first CM logic gate 208 merges the propagate signal $P_0$ and generate signal $G_0$ from first logic gate 132-1 of first stage 204, with the propagate $P_i$ and generate signal $G_i$ of the second logic gate 132-2 of the first stage. Similarly, second CM logic gate 208 of second stage 206 merges the propagate signal $P_2$ and generate signal $G_2$ of the third logic gate 132-3 with the propagate signal $P_3$ and generate signal $G_3$ of fourth logic gate 132-4 of the first stage 204, and so forth for each of CM logic gates 208 in second stage 206.

In one embodiment, a third stage 210 of the sparse carry-merge circuit 202 is coupled to second stage 206 of circuit 210. Representatively, third stage 210 includes a second plurality of CM logic gates 212 (212-1, . . . , 212-15). Similar to the relationship of second stage 206 and first stage 204, each CM gate 212 of third stage 210 is coupled to two adjacent CM logic gates 208 of second stage 206 to merge the two propagate signals ($P_i$ and $P_{i-1}$) and the two generate signals ($G_i$ and $G_{i-1}$) from the two adjacent CM logic 208 gates of second stage 204.

In one embodiment, sparse carry-merge circuit 202 further includes fourth stage 214, fifth stage 218 coupled to fourth stage 214, sixth stage 222 coupled to fifth stage 218 and seventh stage 226 coupled to sixth stage 222 to generate group carries 230. However, in the embodiment illustrated, first group carries 232 are generated following seventh stage (CM6) 226. Representatively, second group carry signals 236 are generated following a final stage (CM7) 234 to generate second group carry signals 236. As further illustrated with reference to FIG. 6, generation of first group carry signals 232 following seventh stage 226 enables the generation of a sum, which in one embodiment represents the least significant 48-bits of the 64-bit effective address. However, in the embodiment illustrated with reference to FIG. 3, group carry signals 230 are generated following seventh stage 226. As described herein, the term "group carries" is interchangeably used to collectively refer to group carries 230, as well as first group carries 232 and second group carries 236.

Representatively, first group carries 232 enables generation of a 48-LSB of effective address 190. In one embodiment, first group carries 232 are provided to enable rapid address generation to output a 48-bit effective address portion. Accordingly, in one embodiment, a lower 48-bits of the effective address are provided to enable a first stage of decoding by, for example, an execution core to access memory. Once the initial calculation is performed, the upper 16 most significant bits of effective address 190 may be used to select, for example, a bank of memory, which is to be accessed.

Accordingly, referring again to the various stages of carry-merge circuit 202, the CM logic receives inputs from previous stages of their propagate and generate signals and continues to merge such signals until an inverter generates a group carry 232/236 for the respective group of the propagate and generate signals. In one embodiment, sparse carry tree merge circuit 202 is divided into critical and non-critical sections. The purpose is to speed-up the critical path by moving a portion of the carry-merge logic to a non-critical path. Accordingly, as illustrated in FIG. 4, the carry generation for group carries 232/236 is part of a critical path, whereas the sum generation is part of the non-critical path, as illustrated with reference to FIG. 5.

Figure 5:
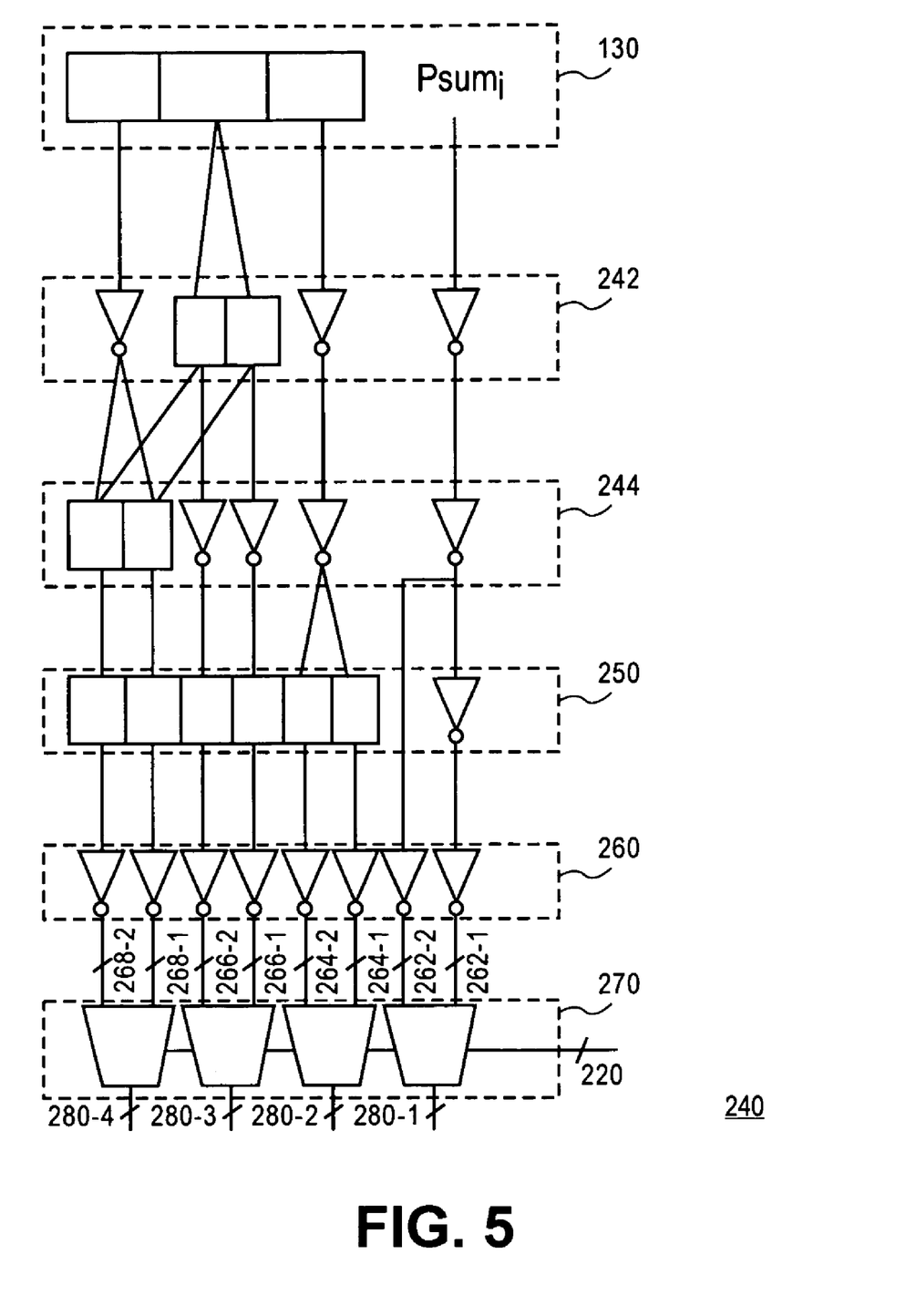
FIG. 5 is a block diagram illustrating a four-bit sum generator, in accordance with one embodiment.

FIG. 5 illustrates a 4-bit sum generator 240, in accordance with one embodiment. During a first stage, PG block 130 provides propagate and generate signals to a first latch stage (CC1) 242. Subsequently, the various propagate and generate outputs signals are provided to a second latch stage (CC2) 244. Once provided, sum XOR logic 250 computes the values, which are provided to inverters 260. Accordingly, as illustrated, the 4-bit sum generators consist of a 4-bit conditional sum generator that generates two sets of sums, $Sum_{i,0}$ 262-1 (assuming an input carry of 0) and $Sum_{i,1}$ 262-2 (assuming an input carry of 1).

The non-criticality of sum generator 240 permits the use the ripple carry-merge scheme to generate the sum. Thus, as shown in FIG. 5, the carry-in at the first level of each conditional carry rail is tied off to 0 and 1, respectively, generating two rails of conditional carries. An XOR by XOR block 250 of the partial sum of the conditional carries generates the conditional sums 262-1, 262-2, 264-1, 264-2, 266-1, 266-2, 268-1 and 268-2. The critical and non-critical sections converge at sum multiplexer (MUX) 270, wherein group carries 230 generated by sparse carry-merge circuit 202 selects the appropriate conditional sum to deliver a final sum 280 (280-1, 280-2, 280-3 and 280-4).

Thus, energy inefficient parallel carry look-ahead logic removed from carry-merge circuit 202 is implemented in a side path using efficient energy-efficient ripple carry design without negatively impacting performance. Accordingly, a plurality of sum generators 240 are provided corresponding to each group carry 232/236 generated by sparse carry-merge circuit 202 of FIG. 4. Accordingly, once carry-in 230 is received by sum MUX 270, sum MUX 270 selects the appropriate 4-bit sum. As described above, AGU 100 is configured to provide, for example, 48 LSB of the effective address during a previous stage two generation of the 16 MSB of the 64-bit effective address. In one embodiment, the critical path and non-critical path may be provided, as illustrated with reference to FIG. 6.

Figure 6:
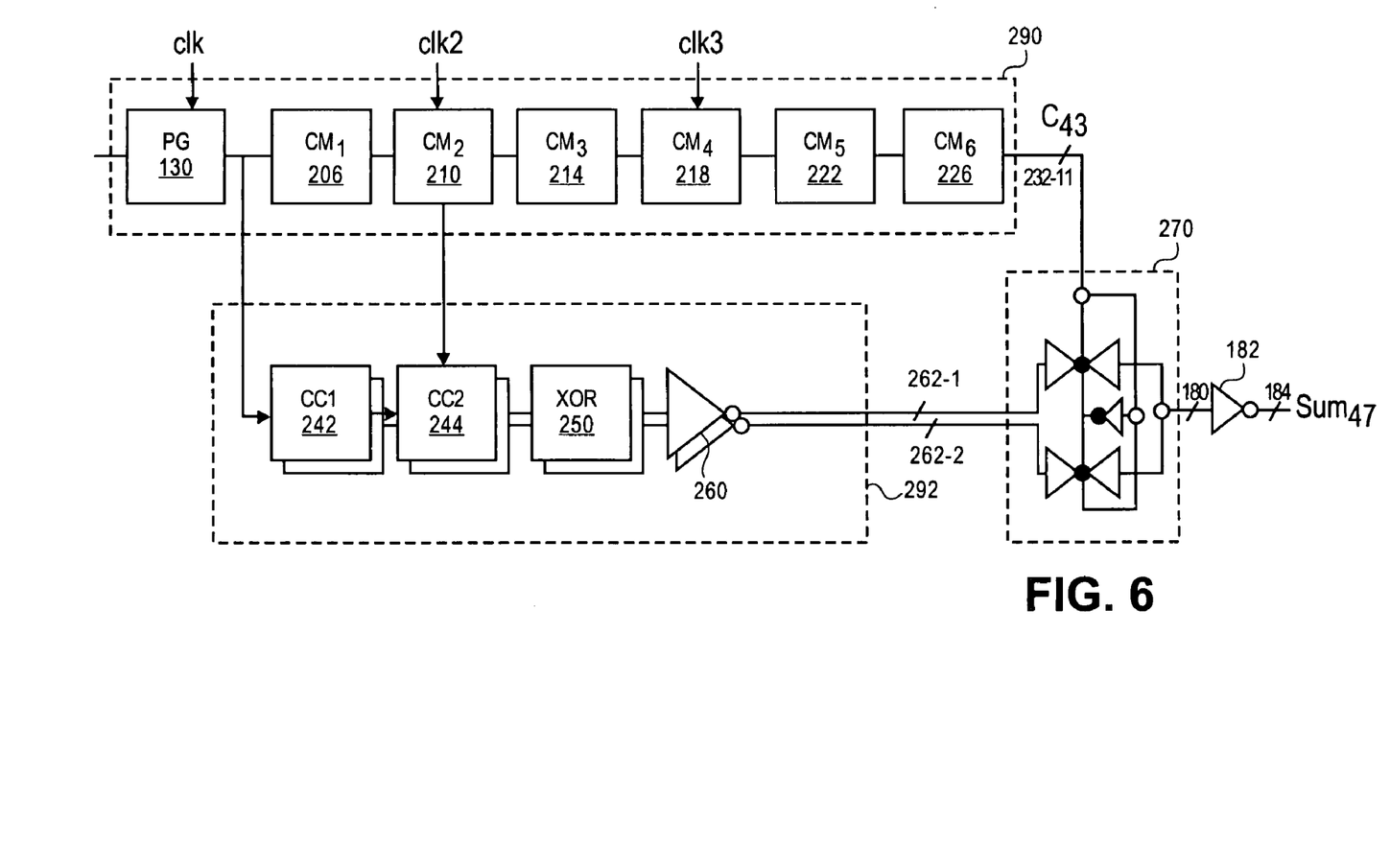
FIG. 6 is a block diagram illustrating a portion of the sparse carry-merge circuit of FIG. 4 and the four-bit sum generator of FIG. 5 to provide a lower or least significant 48-bits of an effective address, in accordance with one embodiment.

In one embodiment, a portion of carry-merge circuit 202 is shown as the critical path, referred to herein as "merge circuit path" 290. Conversely, sum generator 240 of FIG. 5 is shown as non-critical sum generator path 292. Representatively, a two-stage gap between the critical merge circuit path 290 and non-critical sum generator path 292 is provided, such that once group carry-in 232-11 (C43) is provided, sum 184 ($Sum_{47}$) for the lower 48-bits is provided using sum MUX 270. In one embodiment, critical path 290 is implemented in single rail dynamic logic and begins with the PG block 130 generating $P_i$ and $G_i$ signals from inputs $A_i$ and $B_i$. This is followed by the sparse carry-merge implemented in six stages (CM1-CM6), with the final one-in-four carry (C43#) selecting between the two conditional sums (sum 47_1 262-1 and sum 47_0 262-2) using 2:1 transmission gate multiplexer 270. Representatively, critical path 290 includes seven stages (PG, CM1-CM6) in contrast to the five stages (PG, CC0, CC1, XOR and inverter) in the non-critical path 292. As described herein, the "#" symbol represents an active low signal. However, the embodiments described herein apply to both active high and active low signals.

As illustrated in FIGS. 4-6, in one embodiment adder 200 core takes the propagate 150 and generate 160 signals (PG) as its inputs and delivers a 64-bit sum on the output. The sparse carry-merge circuit 202 generates one-in-four primary carries 230. In one embodiment, the 64-bit input is thus divided into 16 groups of 4 bits each. Parallel side-paths, as illustrated in FIG. 5, generate the conditional-sums assuming incoming carries of 0 as well as 1 for each of the 4 bits in each of the 16 groups. The correct sum 280 is finally selected by a multiplexer 270, depending upon group carry signals 230 generated by carry-merge circuit 202. The sparse carry-merge circuit 202 forms the critical path of adder 200 (shown shaded in the figures).

As opposed to this scheme, conventional carry-look ahead adders generate the carries for every bit of the adder. Consequently, the gates in the critical path of this scheme have 50% reduced fanouts on the group generate signals 160 and 33% lower fanout on the group propagate signals 150.

This results in an 18% speedup in the critical path compared to conventional adders with an 80% reduction in interconnect complexity. In one embodiment, adder 200 has 8 stages in the critical path (six stage in carry-merge circuit 202, one multiplexer stage 270 and one final driver stage 282) resulting in an 80 ps delay. The conditional-sum generating sidepath, as shown in FIG. 5, is non-critical and therefore is implemented using an energy efficient ripple-carry adder topology. In one embodiment, adder 200 is implemented using alternating static and dynamic gates. It thus has a 10-20% lower load on the clock driver resulting in up to 20% lower clock power dissipation.

Figure 7:
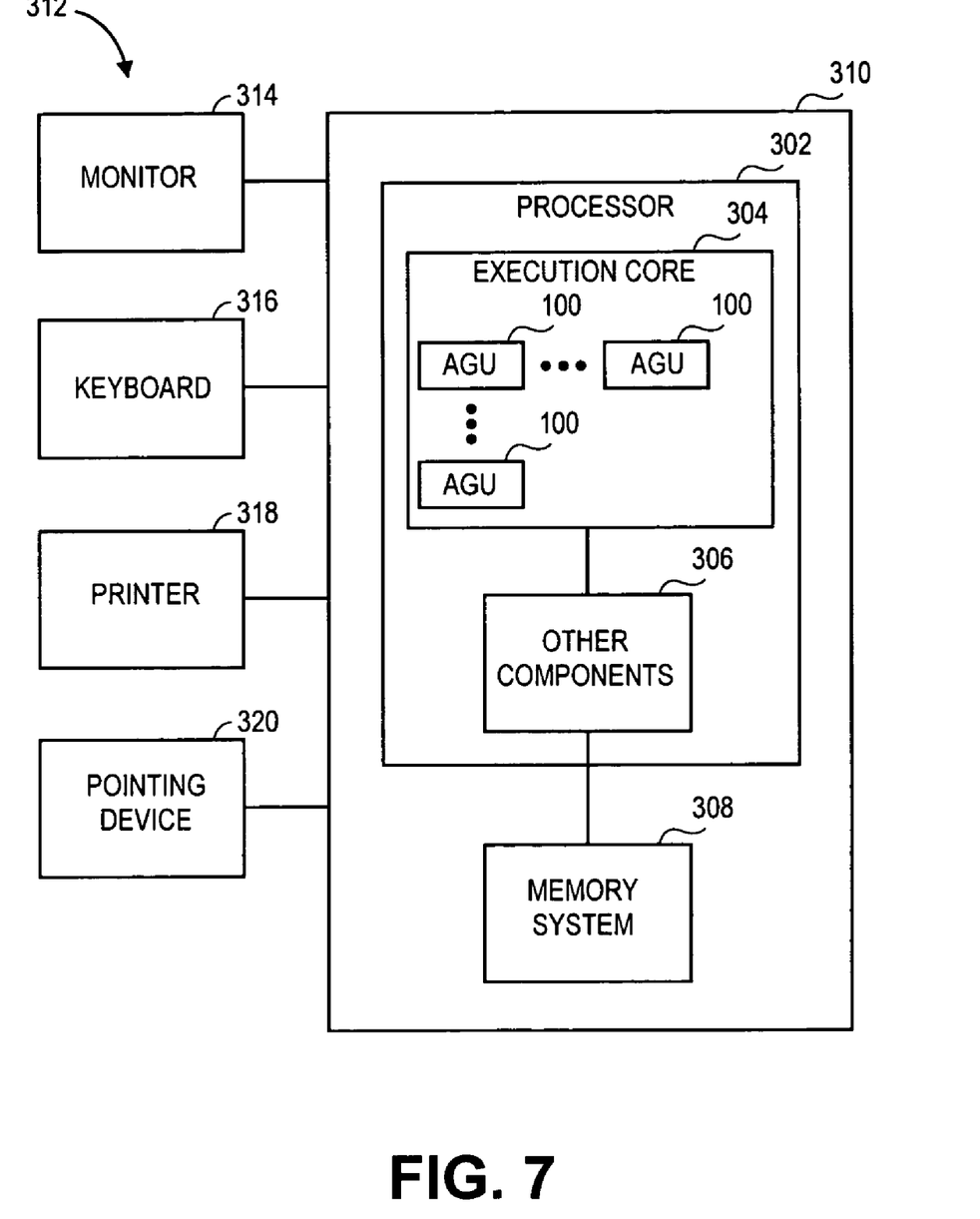
FIG. 7 is a block diagram illustrating a computer system having a processor including an address generation circuit, in accordance with one embodiment.

FIG. 7 is a block diagram of an example of an electronic system 300, such as a computer system or the like and incorporates a 64-bit AGU 100 of FIG. 1, in accordance with one embodiment. The system 300 includes the processor 302, central processing unit (CPU) or the like. The processor 302 includes at least one execution core 104 for executing decoded instructions. The execution core 304 includes at least one address generation unit 100 to compute an effective address to be accessed within memory. To perform the effective address calculation, the AGU 100 contains a 64-bit adder 200. It will be appreciated that processor 302 will include other components 306, such as floating point math unit for calculations involving floating point numbers, cache memories, buffer interface units, buffers and fetch decode units to name a few of the examples of other components 306.

In one embodiment, the processor 302 is coupled to at least one memory system to store programs and other information. The processor 302 and memory system 308 may be contained in a housing or computer unit, depending on the function and features of the electronic or computer system 300 (other components not shown) may be contained in the unit 302. The electronic, or computer system 300, will also include user interface equipment 912 coupled to the processor 302 and memory system 308 to control operation of the system 300. Examples of unit interface equipment 312, depicted in FIG. 7, are a monitor 314, a keyboard 316, a printer 918 and a pointing device 318 or mouse.

Figure 8:
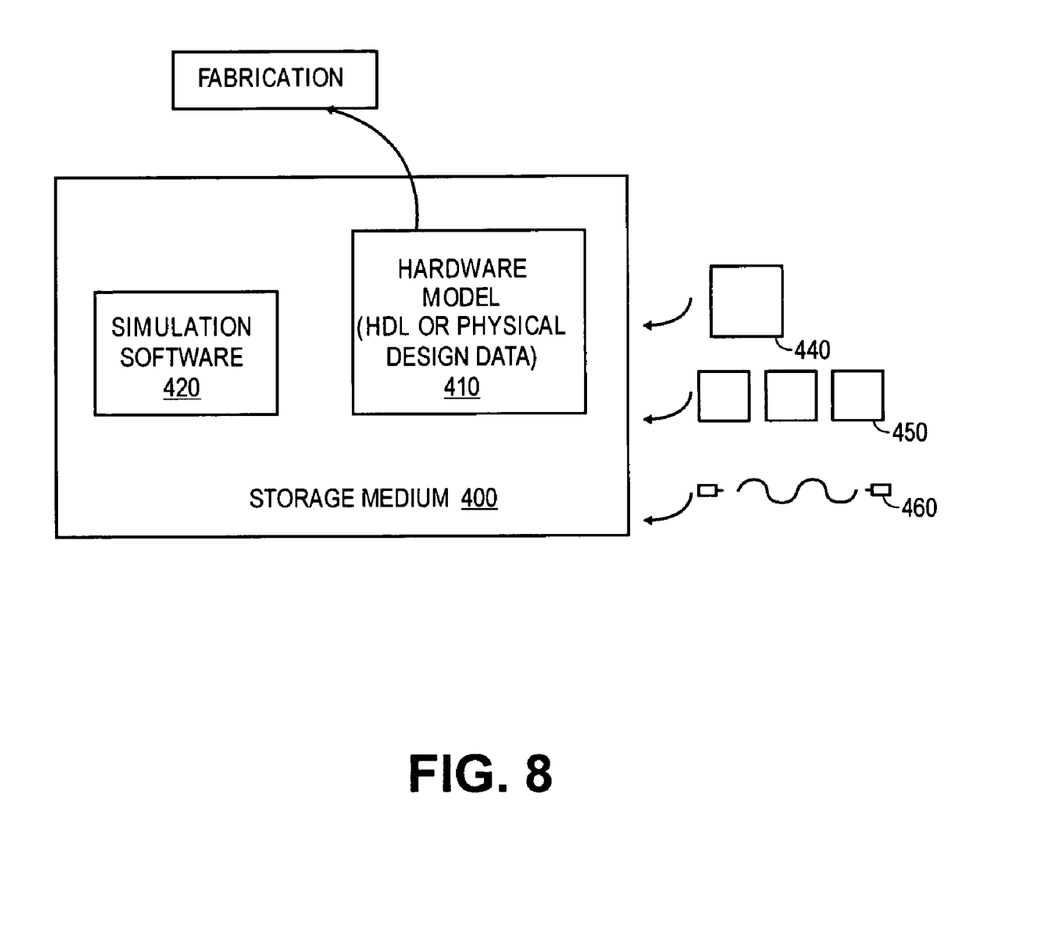
FIG. 8 is a block diagram illustrating various design representations or formats for emulation, simulation and fabrication of a design using the disclosed techniques.

FIG. 9 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 410 may be stored in a storage medium 400, such as a computer memory, so that the model may be simulated using simulation software 420 that applies a particular test suite 430 to the hardware model to determine if it indeed functions as intended. In some embodiments, the simulation software is not recorded, captured or contained in the medium.

In any representation of the design, the data may be stored in any form of a machine readable medium. An optical or electrical wave 460 modulated or otherwise generated to transport such information, a memory 450 or a magnetic or optical storage 440, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 100 includes a single CPU 110, for other embodiments, a multiprocessor system (where one or more processors may be similar in configuration and operation to the CPU 110 described above) may benefit from the two micro-operation flow using source override of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments of the invention as defined by the following claims.

What is claimed is:

1. A method comprising:
generating a carry-in for at least one group of propagate and generate signals formed from a plurality of logical address components;
generating a conditional sum for a logic 0 carry-in and an associated conditional sum for a logic 1 carry-in for the at least one group of propagate and generate signals; and
selecting between the conditional sum for the logic 0 carry-in and for the associated conditional logic 1 carry-in according to the generated carry-in,
wherein a first group of carry-in signals is generated during a first stage of an effective address calculation and prior to generation of a second group of carry-in signals during a second stage of the effective address calculation, the first group of carry-in signals to enable calculation of a first portion of an effective address during the first stage and prior to calculation of a second portion of the effective address during the second stage of the effective address calculation from the logical address components.

2. The method of claim 1, wherein generating the carry-in further comprises:
merging bits of the propagate and generate signals;
generating a plurality of conditional carries for a logic 0 carry-in;
generating another plurality of conditional carries for a logic 1 carry-in;
selecting between a portion of each of the plurality of conditional carries for the logic 0 carry-in and an associated one of the plurality of conditional carries for the logic 1 carry-in to provide a carry-in for a predetermined number of groups of the propagate and generate signals; and
selecting, between a remaining portion of each of the plurality of conditional carries for the logic 0 carry-in and an associated one of the plurality of conditional carries for the logic 1 carry-in to provide a carry-in for each remaining group of the propagate and generate signals.

3. The method of claim 1, wherein generating the carry-in comprises:
generating a carry-in for every 16 bits of the propagate and generate signals grouped from a least significant bit.

4. The method of claim 2, wherein the first portion of the effective address comprises forty-eight least significant bits of the effective address.

5. The method of claim 1, wherein generating the at least one carry-in comprises:
generating a carry-in for every four bits of N-least significant bits of the propagate and generate signals grouped from a least significant bit; and
generating a carry-in for every four bits of M-most significant bits of the propagate and generate signals grouped from a least significant bit.

6. The method of claim 1, wherein generating the conditional sum further comprises:
providing a conditional sum for a logic 0 carry-in for every four bits of the propagate and generate signals grouped from a least significant bit; and
providing an associated conditional sum for a logic 1 carry-in for every four bits of the propagate and generate signals grouped from a least significant bit.

7. The method of claim 1, further comprising:
selecting between each conditional sum for the logic 0 carry-in and an associated conditional sum for the logic 1 carry-in generated for each group of a predetermined number of bits of the propagate and generate signals according to a corresponding group carry-in to provide a final sum as the effective address of the plurality of logical address components.

8. The method of claim 1, wherein prior to computing the carry-in, the method further comprises:
receiving a segment value, a displacement value, a base value, an index value and a scale value as the plurality of logical address components; and p1 generating a 64-bit propagate signal and a 64-bit generate signal from the plurality of logical address components.

9. The method of claim 1, wherein selecting the sum further comprises:
providing N-least significant bits (LSB) of the effective address as the first portion of the effective address prior to providing M-most significant bits as the second portion of the M+N-bit effective address.

10. The method of claim 9, wherein the N-LSB of the effective address comprises 48-bits and the effective address comprises 64-bits.

11. An address generation unit comprising:
a sparse carry-merge circuit to generate a carry-in for at least one group of propagate and a generate signals formed from a plurality of logical address components;
at least one conditional sum generator coupled to the sparse carry-merge circuit to generate a conditional sum assuming a logic 0 carry-in and an associated conditional sum assuming a logic 1 carry-in for the at least one group of propagate and generate signals; and
at least one device to select between the conditional sum and the associated conditional sum according to the carry-in generated by the sparse carry-merge,
wherein the sparse carry-merge circuit is to generate a first group of carry-in signals during a first stage of an effective address calculation and prior to generation of a second group of carry-in signals during a second stage of the effective address calculation, the first group of carry-in signals to enable calculation of a first portion of an effective address during the first stage and prior to calculation of a second portion of the effective address during the second stage of the effective address calculation from the logical address components.

12. The address generation unit of claim 11, wherein the sparse carry-merge circuit is to merge each four-bits of the propagate and generate signals grouped from a least significant bit and to generate a carry-in for each four-bit group of N-least significant bits of
the propagate and generate signals and to generate a carry-in for each four-bit group of M-least significant bits of the propagate and generate signals.

13. The address generation unit of claim 11, wherein the sparse-carry-merge circuit includes a plurality of stages, each stage including a plurality of carry-merge logic gates to combine adjacent output signals from a preceding stage to provide a carry-in for a predetermined number of groups of the propagate and generate signals.

14. The address generation unit of claim 11, wherein the conditional sum generator comprises a plurality of sum generators, each of the sum generators including:
four dual rail sum circuits, each circuit to provide one bit of a final sum and one rail to generate a conditional sum for a logic 0 carry-in and the other rail to generate a conditional sum for a logic 1 carry-in; and
wherein the at least one device comprises a plurality of multiplexers, each multiplexer coupled to each dual rail sum circuit to select the one or the other rail in response to a one in four carry from the sparse carry-merge circuit.

15. The address generation unit of claim 11, further comprising:
logic to receive a segment value, a displacement value, a base value, an index value and a scale value as the plurality of logical address components and to generate the propagate signal and the generate signal from the plurality of logical address components.

16. The address generation unit of claim 11, wherein the sparse carry-merge circuit further comprises a plurality of circuits to each generate a carry signal for each group of the propagate and generate signals, each of the plurality of circuits including:
a first rail adapted to generate a first conditional carry;
a second rail adapted to generate a second conditional carry; and
a multiplexer adapted to select between the first conditional carry and the second conditional carry to form a carry-in for every four-bits of the propagate and generate signals grouped from a least significant bit.

17. The address generation unit of claim 11, wherein the conditional sum generator comprises a plurality of sum generators, each sum generator including a plurality of stages of ripple carry-merge gates and exclusive OR gates.

18. The address generation unit of claim 11, wherein the at least one device to provide a N-least significant bits (LSB) as the first portion of the effective address prior to providing a M-most significant bits as the second portion of the M+N-bit effective address.

19. The address generation unit of claim 11, wherein the N- LSB of the effective address comprises 48-bits and the effective address comprises 64-bits.

20. A system comprising:
a processor, including at least one address generation unit having an adder including:
a sparse carry-merge circuit to generate a carry-in for each group of propagate and a generate signals formed from a plurality of logical address components, a plurality of sum generators coupled to the sparse carry-merge circuit to generate a conditional sum assuming a logic 0 carry-in and an associated conditional sum assuming a logic 1 carry-in for each of the propagate and a generate signals, and a plurality of devices, each device to select between a respective conditional sum and an associated conditional sum from a corresponding conditional sum generator according to a corresponding carry-in generated by the sparse carry-merge circuits wherein the sparse-carry merge circuit is to generate a first group of carry-in signals during a first stage of an effective address calculation and prior to generation of a second group of carry-in signals during a second stage of the effective address calculation, the first group of carry-in signals to enable calculation of a first portion of an effective address during the first stage and prior to calculation of a second portion of the effective address during the second stage of the effective address calculation from the logical address components; and a memory system coupled to the processor.

21. The system of claim 20, wherein the sparse carry-merge circuit generates at least one carry for every group of sixteen bits of the propagate and generate signals grouped from a least significant bit.

22. The system of claim 20, wherein the spare carry-merge circuit generates at least one carry signal for every four-bits of the propagate and generate signals grouped from a least significant bit.

23. The system of claim 20, wherein each of the sum generators comprises:

four dual rail sum circuits, each circuit providing one bit of a final sum and one rail generating a conditional sum for a logic 0 carry-in and the other rail generating a conditional sum for a logic 1 carry-in; and a multiplexer coupled to each dual rail sum circuit to select the one or the other rail in response to a one in four carry from the sparse carry-merge circuit.

24. The system of claim 20, wherein the first portion comprises N-least significant bits (LSB) of the effective address and the second portion comprising M-most significant bits of an M+N-bit effective address.

25. The system of claim 24, wherein the lower N- LSB of the effective address comprises 48-bits and the effective address comprises 64-bits.

26. A machine readable storage medium having encoded thereon a circuit design for fabrication into an address generator circuit which, when fabricated, comprises:

a sparse carry-merge circuit to generate a carry-in for each group of propagate and a generate signals formed from a plurality of logical address components;

a plurality of sum generators coupled to the sparse carry-merge circuit to generate a conditional sum assuming a logic 0 carry-in and an associated conditional sum assuming a logic 1 carry-in for each of the propagate and a generate signals; and a plurality of devices, each device to select between a respective conditional sum and an associated conditional sum from a corresponding conditional sum generator according to a carry-in generated by the sparse carry-merge circuit, wherein the sparse-carry merge circuit is to generate a first group of carry-in signals during a first stage of an effective address calculation and prior to generation of a second group of carry-in signals during a second stage of the effective address calculation, the first group of carry-in signals to enable calculation of a first portion of an effective address during the first stage and prior to calculation of a second portion of an effective address during the second stage of an effective address calculation from the logical address components.

27. The machine readable storage medium of claim 26, wherein each of the sum generators comprises:

four dual rail sum circuits, each circuit to provide one bit of a final sum and one rail to generate a conditional sum for a logic 0 carry-in and the other rail to generate a conditional sum for a logic 1 carry-in; and a multiplexer coupled to each dual rail sum circuit to select the one or the other rail in response to a one in four carry from the sparse carry-merge circuit.

28. The machine readable storage medium of claim 26, wherein the sparse-carry-merge circuit includes a plurality of stages, each stage including a plurality of carry-merge logic gates to combine adjacent output signals from a preceding stage to provide a carry-in for a predetermined number of groups of the propagate and generate signals.

29. The machine readable storage medium of claim 26, wherein the sparse carry-merge circuit further comprises a plurality of circuits to each generate a carry signal for each group of the propagate and generate signals, each of the plurality of circuits including:

a first rail adapted to generate a first conditional carry;

a second rail adapted to generate a second conditional carry; and a multiplexer adapted to select between the first conditional carry and the second conditional carry to provide a carry-in for every four-bits of N-least significant bits of the propagate and generate signals grouped from a least significant bit in a first stage and to provide a carry-in for every four-bits of M-most significant bits of the propagate and generate signals group for a least significant group in a second stage.

30. The machine readable storage medium of claim 26, wherein the address generator circuit further comprises:

logic to receive a segment value, a displacement value, a base value, an index value and a scale value as the plurality of logical address components and to generate the propagate signal and the generate signal from the plurality of logical address components.

* * * * *

UNITED STATES PATENT AND TRADEMARK OFFICE
CERTIFICATE OF CORRECTION

PATENT NO. : 7,380,099 B2
APPLICATION NO. : 10/956164
DATED : May 27, 2008
INVENTOR(S) : Mathew et al.

It is certified that error appears in the above-identified patent and that said Letters Patent is hereby corrected as shown below:

In column 9, at line 37, after "and" delete "p1".

Signed and Sealed this

Ninth Day of December, 2008

JON W. DUDAS
*Director of the United States Patent and Trademark Office*